Aug. 31, 1937.  P. J. MERCATORIS  2,091,827
SHRUBBERY TRIMMER
Filed July 13, 1935  2 Sheets-Sheet 2

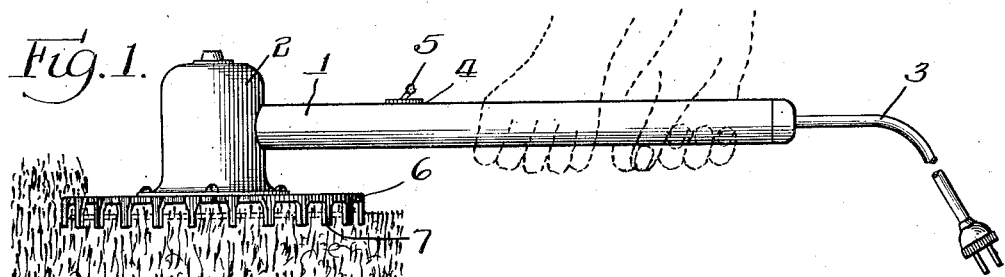
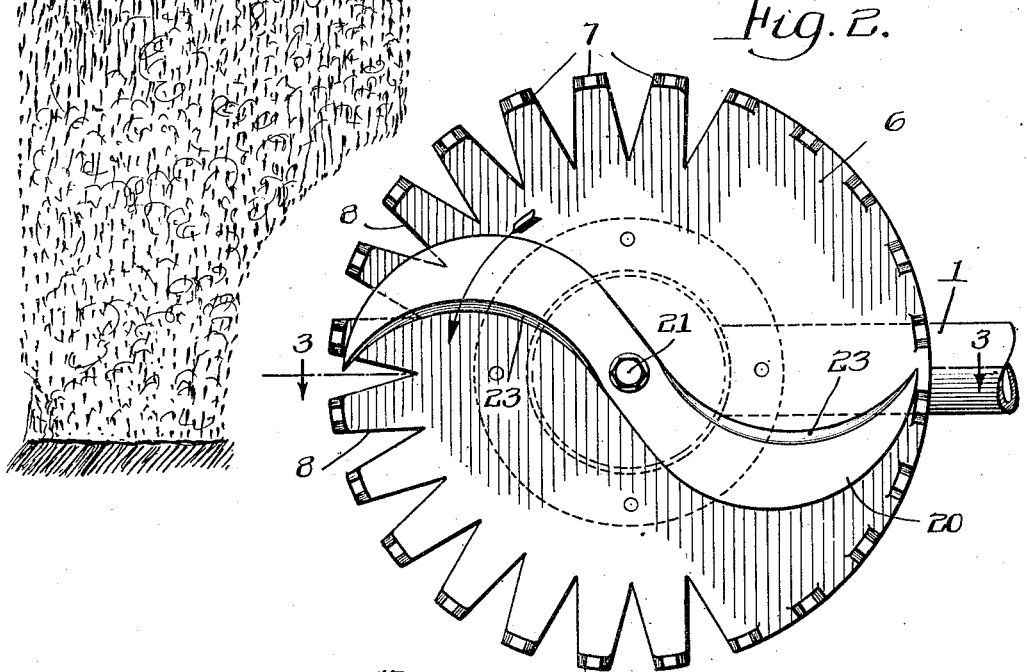
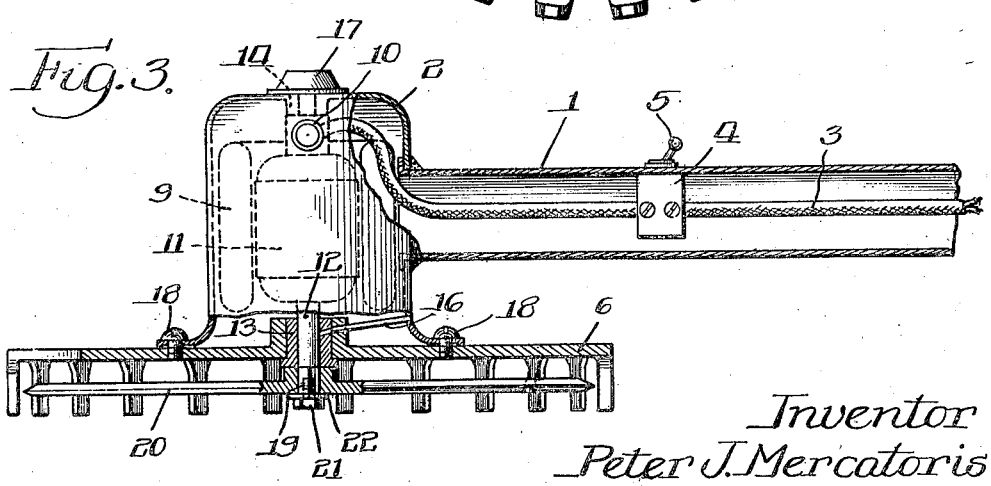

Inventor:-
Peter J. Mercatoris
By:- Cox & Moore
attys.

Patented Aug. 31, 1937

2,091,827

UNITED STATES PATENT OFFICE 2,091,827

SHRUBBERY TRIMMER

Peter J. Mercatoris, Niles Center, Ill.

Application July 13, 1935, Serial No. 31,257

10 Claims. (Cl. 30—276)

This invention relates in general to a new and improved device for cutting, clipping and trimming hedges, bushes, shrubbery and the like.

It is an object of this invention to provide means for trimming shrubbery and hedges in a speedy and efficient manner.

It is another object of this invention to provide a rapidly operating power motivated device for clipping and trimming hedges and shrubbery.

It is another object of this invention to provide a completely portable power motivated device for clipping and trimming hedges and shrubbery.

It is another object of this invention to provide an entirely self-contained portable power motivated device for clipping and trimming hedges and shrubbery.

Numerous other objects and advantages will more fully appear during the course and progress of the following specification.

Fig. 1 is an elevation view of one preferred embodiment of the present invention showing in diagrammatic fashion the operation of this embodiment in clipping a hedge.

Fig. 2 is a plan view of the cutting head of the embodiment, shown in Fig. 1.

Fig. 3 is a cross-sectional view of the preferred embodiment, shown in Figs. 1 and 2 about line 3—3 of Fig. 2.

Figure 4:
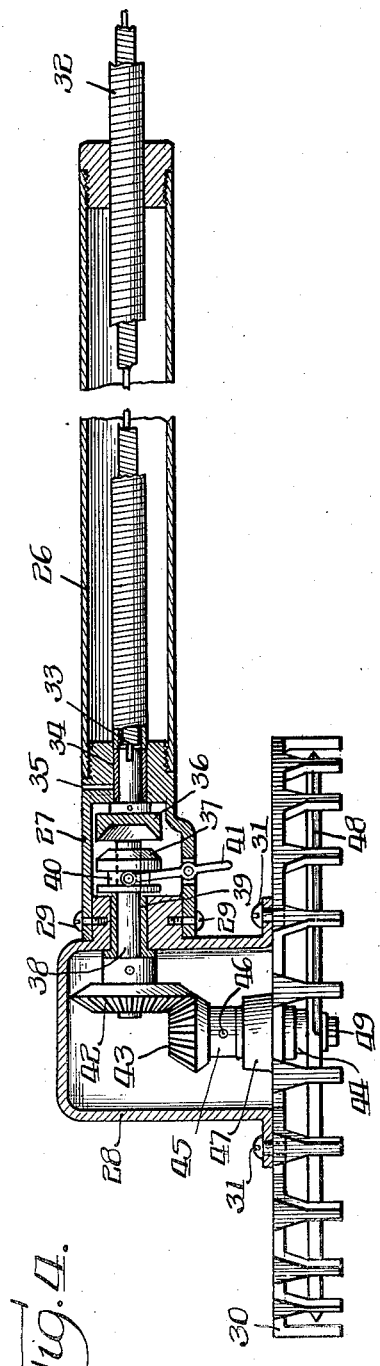
Fig. 4 is a cross-section view of another preferred embodiment of the present invention.

The preferred embodiment, shown in Fig. 1, comprises a long tubular handle 1 which is spot-welded to a motor housing 2. An electric conduit cord 3 passes through the shaft 1. A toggle switch 4 is located in the handle 1 and is operated by the lever 5. A guard member 6 is fastened to the lower end of the motor housing 2. The guard member 6 is formed with a plurality of downwardly extending tines 7. The guard member 6 is preferably circular and the tines 7 are located at spaced intervals all around the circumference thereof. A portion of the circumference of the guard member is provided with a plurality of V-shaped slots 8 which extend radially inwardly from the periphery of the guard member between adjacent tines. If desirable, the slots may be located around the entire periphery of the guard member. An electric motor 9 is located inside the housing 2, as shown in Fig. 3.

The electric conduit cord 3 is shown passing through the handle up to the toggle switch 4. This toggle switch 4 is of any standard design suitable for making and breaking the electric circuit. The conduit leads from the switch thence to the terminals 10 of the motor 9. The armature 11 of the motor 9 is fitted with a shaft 12 which passes through the forward bearing 13 of the motor. This bearing may be preferably carried by the guard member 6, as shown. The shaft at its other end rides in the rear bearing 14 of the motor 9. The bearing 13 is provided with an oil duct 16 so that this bearing may be properly lubricated. Similarly the rear bearing 14 is provided with an oil-retaining device 17. The guard member 6 is affixed to the motor housing 2 by means of the screws 18. The shaft 12 terminates at its forward extremity in a square-ended portion 19. An S-shaped knife 20, which is shown in plan in Fig. 2, is fitted on the end of the shaft 12 around the square-shaped end 19 thereof and held in place by the nut 21 and lock washer 22. The S-shaped knife 20, in the embodiment shown in Figs. 1, 2, and 3, is designed for counter-clockwise rotation as indicated by the direction of the arrow in Fig. 2. As will be seen from Fig. 2, the knife is ground with cutting edges 23. This knife is furthermore designed so as to rotate entirely within the circle formed by the downwardly extending tines 7, the knife being just short enough so that the points will substantially clear the inside surface of the tines 7.

When it is desired to use this device the plug end of the electric cord is inserted into a suitable source of electric current and the switch is turned on, the current flowing through the cord member and the switch energizes the fields of the motor 9 and the armature is set in rotation. The knife is rapidly whirled in a circular direction with the rotation of the armature. The device is then brought up against a hedge or shrub which is to be clipped. The ends of the shrubbery will come in contact with the knife and be clipped off thereby. The device should be pushed forward into the hedge along a direction parallel to the axis of the handle so that the extending ends of the hedge or shrub will be caught by the V-shaped notches in the guard member and held in that position as the knife cuts them. As the knife cuts away the portions of the hedge in this described fashion, the device may be moved further forward into the hedge cutting its way in as it were. The device may also be placed up against a hedge by bringing it directly down flatwise against the portion of the hedge to be cut. The sharpened edges of the knife are sufficient to cut even the very toughest of hedges. This is true particularly if the motor used is designed to rotate the knife at a high rate of speed. The speed of the knife, not only serves to increase the cleanness of the cutting action thereof, but also, in view of the S-shaped character thereof, serves to clear away the cut-off portions so as to prevent the device from becoming clogged with debris. The guard member prevents accident by reason of unauthorized interposition of portions of the body in the way of the knife and furthermore serves as a guide member for the portions of the shrub being cut when it is desired to insert the device edgewise into a hedge.

It may frequently occur in gardening operations that a source of electric current is not readily available or, for a number of possible reasons, it might be impractical or undesirable in a given set of circumstances to have the electric motor mounted directly above the cutting head of the device. Thus it is possible to use the modification, shown in Fig. 4. This modification comprises a hollow tubular handle 26 which is threaded onto a clutch housing 27. The clutch housing 27 is fitted onto a cutting head housing 28 by means of the screws 29. A guard plate 30 is fitted onto the lower extremity by means of the screws 31. This guard plate is substantially similar to the guard member 7, described in connection with Figs. 1, 2, and 3. A flexible power transmitting shaft 32 passes through the handle 26 and is attached to the clutch shaft 33. This clutch shaft is mounted in the bearing member 34 of the clutch housing 27. This bearing is fitted with an oil duct 35 for lubricating the bearing 34. The shaft 33 carries a clutch plate 36 which is preferably of the conical clutch design. A conical clutch face plate 37 adapted to engage the clutch plate 36 is slidingly mounted on the transmission shaft 38. The transmission shaft 38 rides in the bearing 39 which is fitted into a part of the cutting head housing 28. The clutch face plate 37 is provided with a channeled collar portion which receives the clutch operating yoke and lever 41. It should be noted that this clutch is of conventional design and any conventional type of clutch mechanism may be utilized if preferable.

Inside the cutting head housing 28 on the forward extremity of the transmission shaft 38 is mounted a beveled gear 42 which rotates in a vertical plane and meshes with a second beveled gear 43. The beveled gear 43 is fixed directly to the cutting head shaft 44. The cutting head shaft 44 passes through a bearing 45. The bearing 45 is provided with an oil lubrication duct 46 and is mounted in bearing collar 47. The bearing collar 47 is preferably formed integrally with the guard plate member 30. The cutting head shaft 44 has a square-ended portion for receiving the cutting knife 48 which is attached thereto and held in place between a nut and lock washer assembly 49. The cutting knife 48 is preferably of the same S-shaped design as that described in connection with the cutting knife 20 of Fig. 2. The flexible power shaft 32 may be of any suitable length and may extend outward from the device some distance and be coupled to an electric motor located at some distance from the device. This may be a convenient practice in view of the fact that this modification of the present invention permits the manufacture of a hedge trimming tool which is lighter at the manually operated portion. Furthermore it may be more convenient to locate the electric motor on a small portable truck which may be moved around to closer proximity with a source of electric current.

Another application of this particular modification may be made in connection with the clipping of park hedges where a source of electric current for the electric motor, described in connection with the modification shown in Figs. 1, 2, and 3, is not convenient. In this instance it may be possible to mount a small gasoline motor on a portable truck or "dolly." The present modification may be coupled to this source of power by means of the flexible shaft. This dispenses with the need for electric current.

Figure 5:
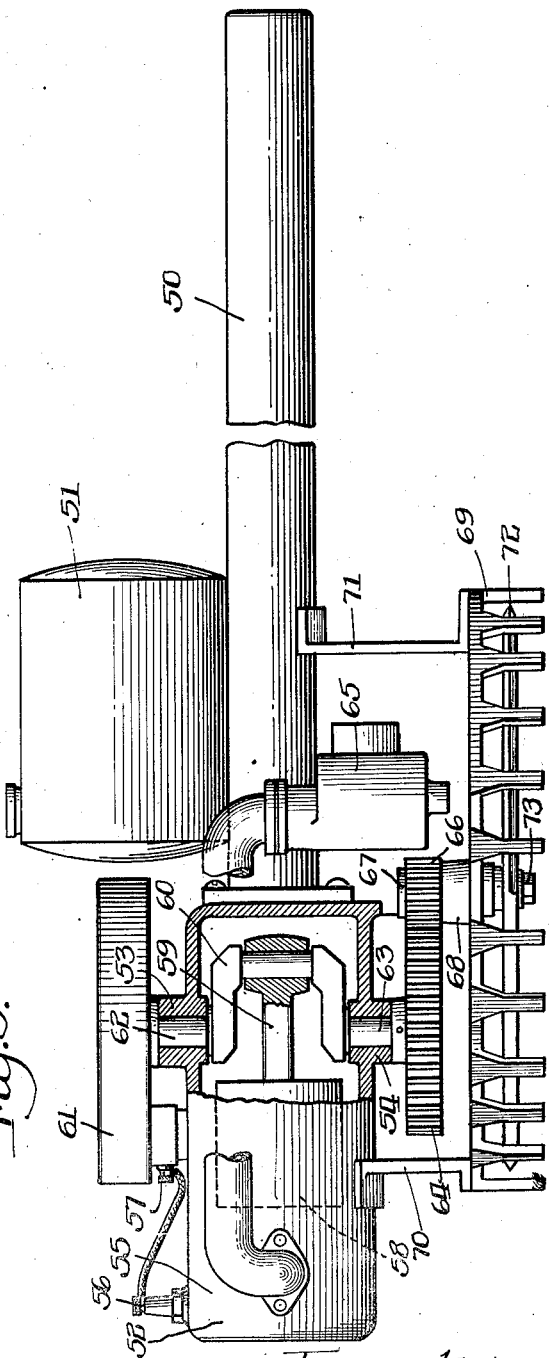
Fig. 5 is a plan view of another preferred embodiment of the present invention showing a broken-away section to reveal a detail of the internal mechanism of this embodiment.

The modification, shown in Fig. 5, is substantially similar in operation to the modifications previously described except that this device involves a combination with a different form of power means. In this modification a small compact gasoline motor has been designed to be incorporated compactly in the cutting head portion of the hedgetrimmer. The gasoline motor is of substantially conventional design. This modification comprises a handle member 50 on which is mounted a small gasoline tank 51. The handle 50 is fitted onto the motor housing 52. The motor housing 52 carries a forward bearing 53 and a transmission bearing 54 integrally formed therein. The cylinder is formed in the forward portion 55 of the motor housing 52. An ignition device 56 is also located at the forward end of the motor housing. The ignition device is connected to a magneto 57. A piston 58 is located inside the cylinder 55. The cylinder is connected by means of the connecting rod 59 to the crank shaft 60. The crank shaft 60 is connected at one extremity to the flywheel 61 through the shaft 62 which runs in the bearing 53. The other end of the crank shaft 60 terminates in the shaft member 63 which passes through the bearing 54. On this shaft 63 is mounted a large transmission gear wheel 64. The motor is supplied with fuel through the carburetor 65 which is also mounted on the shaft 50 in proximity to the gasoline tank 51. This carburetor 65 may be of any conventional carburetor design. The power transmission gear 64 meshes with the cutting knife gear 66. The cutting knife gear 66 is mounted on one extremity of the cutting knife shaft 67. This shaft 67 runs in the bearing 68 which is preferably formed as an integral part of the cutter guard member 69. The cutter guard member 69 is rigidly mounted at the forward end to the motor housing 52 through the bracket 70 and at the rearward end to the handle member 50 through the bracket 71. The cutter guard member 69 is substantially the same design as the guard member 6, described in connection with the modification shown in Figs. 1, 2 and 3. A cutter knife 72 is mounted on the other extremity of the cutter knife shaft 67 by means of a nut and lock washer assembly 73. This cutter knife 72 is also of substantially the same design and operation as the cutter knife 20, described in connection with the modification shown in Figs. 1, 2, and 3. This modification of the present invention makes it possible to have a completely portable hedgetrimming device which is not limited in its use by proximity to electric current or other power means.

It is to be understood that the present invention is not to be confined to the details of construction of the preferred embodiments thereof, hereinbefore given by way of example, nor to the particular application described, as the invention may be embodied in various modifications and equivalents of the elements in the above specification without departing from the spirit of the invention or sacrificing any of its advantages and the right is hereby reserved to make all such changes as fairly fall within the scope of the following claims.

The invention is hereby claimed as follows:

1. A shrubbery trimming machine, comprising a handle, a bell-shaped housing mounted on the handle, power means mounted in the housing, control means for the power means mounted in said handle, a disk-shaped guard means mounted on the open end of the housing, and an S-shaped cutting knife operably connected to the power means, said cutting knife being adapted to rotate in a plane parallel to the guard means.

2. A shrubbery trimming machine, comprising a handle, a housing mounted on the handle, an electric motor mounted in the housing, control means for the electric motor mounted in said handle, said electric motor being so mounted on the handle that the axis of the shaft is permanently perpendicular to the axis of the handle, a guard member mounted on one end of the housing, said guard member having a plurality of spaced apart projections arranged circumferentially around the outer periphery of said guard member, said projections extending downwardly at right angles to the body of the guard member, and a rotatable cutting knife operably connected to the power means, said cutting knife having a plane of rotation which is parallel to the body of the guard member, said plane being disposed away from the plane of the body of the guard member a distance less than the length of the vertical projections.

3. A device of the character described, comprising a handle, a housing mounted on the handle, an internal combustion motor mounted in the housing having the thrust line of its pistons lying in the plane of the axis of the handle, guard means mounted on one end of the housing, and cutting means operably connected to the internal combustion motor and located within the guard means so as to operate entirely therein.

4. A device of the character described, comprising a handle, a housing mounted on the handle, an electric motor mounted in the housing, said motor being so mounted that the axis of its shaft is permanently perpendicular to the axis of the handle, and a guard member mounted on one end of the housing, said guard member having a plurality of spaced apart projections arranged circumferentially around the outer periphery of said guard member, said projections extending downwardly at right angles to the body of the guard member, and a rotatable cutting knife operably connected to the electric motor, said cutting knife having a plane of rotation which is parallel to the body of the guard member, said plane being disposed away from the plane of the body of the guard member a distance less than the length of the vertical projections.

5. A device of the character described, comprising a handle, a housing mounted on the handle, an internal combustion motor mounted in the housing, a guard member mounted on one end of the housing, said guard member having a plurality of spaced apart projections arranged circumferentially around the outer periphery of said guard member, said projections extending downwardly at right angles to the body of the guard member, and a rotatable cutting knife operably connected to the internal combustion motor, said cutting knife having a plane of rotation which is parallel to the body of the guard member.

6. A device of the character described, comprising a handle, a housing mounted on the handle, an internal combustion motor mounted in the housing, a guard member mounted on one end of the housing, said guard member having a plurality of spaced apart projections arranged circumferentially around the outer periphery of said guard member, said projections extending downwardly at right angles to the body of the guard member, and a rotatable cutting knife operably connected to the internal combustion motor, said cutting knife having a plane of rotation which is parallel to the body of the guard member, said plane being disposed away from the plane of the body of the guard member a distance less than the length of the vertical projections.

7. A device of the character described, comprising a handle, a housing mounted on the handle, an electric motor mounted in the housing, electric conduit means connected at one end of said electric motor for transmitting energizing electric current to said motor and connected at the other end to contactor means whereby to connect said conduit means to any suitable source of electric energy at will, said conduit extending from said motor longitudinally through the handle, a guard member mounted on one end of the housing, said guard member having a plurality of spaced apart projections arranged circumferentially around the outer periphery of said guard member, said projections extending downwardly at right angles to the body of the guard member, and a rotatable cutting knife operably connected to the electric motor, said cutting knife having a plane of rotation which is parallel to the body of the guard member, said plane being disposed away from the plane of the body of the guard member a distance less than the length of the vertical projections.

8. A device of the character described, comprising a hollow tubular handle, a clutch housing mounted on the handle, a gear housing mounted on the clutch housing, a flexible power transmitting shaft, cone clutch means mounted within the clutch housing, driving gear means operably mounted in the gear housing, said clutch means being so arranged as to clutchingly connect the driving gear means with the flexible power transmitting shaft, a rotatable cutting knife operably connected to the driving gear means, and a circular guard plate mounted on the housing in juxtaposition to the knife, said guard plate having a plurality of peripherally located cut-away portions extending radially inwardly over the plane of movement of the knife whereby to permit the introduction of the material to be cut into the cutting plane.

9. A device of the character described, comprising a hollow tubular handle, a clutch housing mounted on the handle, a gear housing mounted on the clutch housing, a flexible power transmitting shaft, clutch means mounted within the clutch housing, driving gear means operably mounted in the gear housing, said clutch means being so arranged as to clutchingly connect the driving gear means with the flexible power transmitting shaft, a rotatable cutting knife operably connected to the driving gear means, and a circular guard plate mounted on the housing in juxtaposition to the knife, said guard plate having a plurality of spaced apart downwardly disposed tines arranged circumferentially around the outer periphery of said guard plate, said guard plate also having a plurality of peripherally located cut-away portions extending radially inwardly over the plane of movement of the knife, each cut-away portion being located in the area of the guard plate between a pair of adjacent tines whereby to permit the introduction of material to be cut into the cutting plane.

10. A shrubbery trimming machine having a long handle, an electric motor mounted at one end of said handle, control means for the electric motor mounted in said handle, said electric motor being so mounted on the handle that the axis of its shaft is permanently perpendicular to the axis of the handle, an S-shaped highly-sharpened cutter mounted on said shaft and adapted to run in a plane perpendicular to the axis of the shaft, said cutter being mounted on said shaft centrally of its length, a flat circular disk mounted on the electric motor and lying in a plane slightly above the plane of operation of the cutter, said disk having a radius greater than the operative radius of the cutter, said disk having a plurality of downwardly extending tines spacially located around its entire circumference, said tines extending perpendicularly downwardly from said disk to a point below the operative plane of the cutter, and a plurality of V-shaped slots extending radially inwardly of the outer circumference of said disk for only a part of the distance around the circumference and in the area of the forward edge of the shrubbery trimming machine.

PETER J. MERCATORIS.